M. C. SCHWEINERT.
TIRE VALVE.
APPLICATION FILED FEB. 8, 1913.
1,171,147.
Patented Feb. 8, 1916.
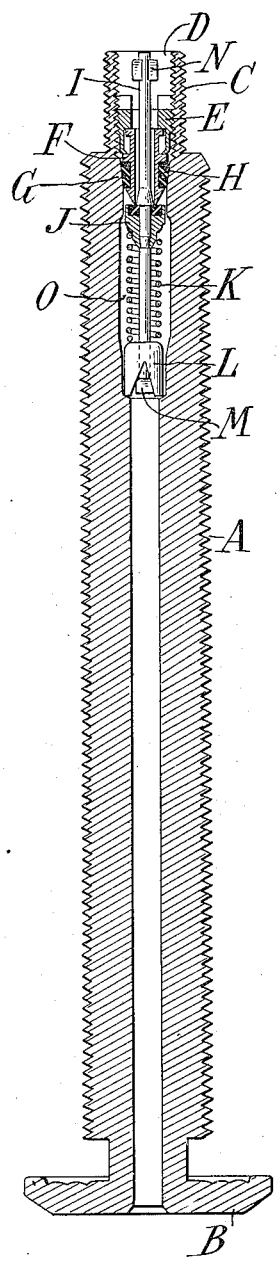
WITNESSES:
René Bruine
J. F. Wallace
INVENTOR :
Maximilian Charles Schweinert
By Attorneys,
Fraser Turk & Myers

UNITED STATES PATENT OFFICE.

MAXIMILIAN CHARLES SCHWEINERT, OF WEST HOBOKEN, NEW JERSEY.

TIRE-VALVE.

1,171,147.  Specification of Letters Patent.  Patented Feb. 8, 1916.

Application filed February 8, 1913. Serial No. 747,062.

*To all whom it may concern:*

Be it known that I, MAXIMILIAN CHARLES SCHWEINERT, a citizen of the United States, residing at West Hoboken, in the county of Hudson and State of New Jersey, have invented certain new and useful Improvements in Tire-Valves, of which the following is a specification.

This invention relates to valves which are particularly designed for pneumatic tires although it is susceptible of use in either connections.

The standard tire valve in use at the present time comprises a casing or shell which is adapted to be connected to a pneumatic tire or the inner tube thereof, and to extend through a hole in the rim and the felly of the wheel. The valve mechanism is adapted to screw in the casing, and for the purpose of easy inspection and replacement it is inserted through the outer or free end of the casing. The valve mechanism comprises a seat member, a valve plunger, an operating spring for the plunger, a deflating pin attached to the plunger and extending through the seat member and spring, and a means usually a swiveled plug for holding the seat member in place within the shell. The shell is provided with a shoulder against which the seat member is pressed, a packing carried by the seat member being pressed against the shoulder to make a tight joint between the seat member and the shell. These parts are fastened together to form a connected valve structure so that essentially in use the valve comprises two separable parts, the casing and the so-called valve insides. In this type of valve the valve mechanism or valve insides are entirely inclosed within the casing so that there is no exterior joint in the latter through which leakage may take place, and the whole structure is closed by a valve cap which fits on the outer end of the casing, such cap protecting the valve insides from dust and securing an additional protection against leakage so that if the valve insides should become leaky for any reason the air will be prevented from escaping from the shell by the cap. This type of valve has gone into very extended use, and its various dimensions have become practically fixed and standard.

The object of the present invention is to increase the capacity of the valve for the ingress and egress of air while retaining the dimensions which have become standard, and permitting free interchangeability of the valve insides and casings with those now on the market. As now constructed the area of the effective passage between the valve plunger and the shell is theoretically sufficient to allow the free passage of all of the air which passes the other parts of the valve mechanism; that is to say, there is apparently no restriction of the air in passing around the plunger. I have found in practice, however, that the capacity of the valve to permit the passage of air through it either inwardly or outwardly is very materially increased by enlarging the diameter of the chamber in which the plunger works. Heretofore this chamber has been of smaller diameter than the opening in the top of the casing into which the valve seat and its plug have been screwed, this being necessary to provide the shoulder hereinbefore referred to against which the valve seat packing engages in order to secure the necessary leak-tight joint between the seat and the casing. Whether the reduced capacity of the valve around the plunger has been due to the more extended skin friction at this point, or whether there is a peculiar backing up of the air at this point I am unable to state, but the results in practice indicate that by an enlargement of the valve chamber while retaining the same diameter of plunger I am enabled to greatly increase the capacity of the valve.

Referring to the drawings which illustrate the preferred form of the invention,— the figure is a diametrical section of the improved valve.

Referring to the drawing, let A indicate a valve casing which is usually screw-threaded on its exterior and provided with a foot B which is adapted to be passed within the tire or inner tube, the latter being clamped in place by nuts engaging the exterior of the casing A, which nuts are not shown. The diameter of the casing A is fixed or standard since this cannot practically be enlarged owing to the standardization of the hole through the rim and felly of the wheel to which the tire is applied. At the top of the casing is a nipple C which also is of fixed dimensions, the outer diameter being adapted to receive the usual valve cap, of which there are large quantities on the market, the cap and nipple being so proportioned that when the cap is in place the valve will pass through the hole in the rim. The top of the nipple is bored at D and internally screw-threaded to receive the screw-threaded plug E which is swiveled to the seat member F, and by means of which the seat member is held in place within the casing. In order to retain the interchangeability of valve mechanisms or insides now in large quantities upon the market, it is undesirable to change the internal diameter of the bore D; it is also found that with a fixed external diameter there is insufficient metal to enlarge the bore. At the bottom of the bore is a seat G in the form of a tapered shoulder which is adapted to engage a packing H carried by the seat member F, and it is practically necessary to retain the exact dimensions of this seat in order to provide for the interchangeability of valve insides or plungers now on the market in connection with the shell provided by the present invention.

Passing through openings in the plug E and seat F is a pin I having fixed to it below the seat F a valve proper or plunger J, the pin extending below the plunger and carrying a spring K and spring cup or guide L, the end of the pin being upset at M to prevent the escape of the spring and cap and at N to prevent the separation of the plug and seat member. Below the seat G is a valve chamber O in which works the plunger J. Formerly the valve chamber O has been of the same diameter as the bottom of the seat G, the parts being constructed by drilling the chamber and bore D of appropriate diameters and facing off the seat G. With the type of valve insides shown which have gone into very extended use, the free space between the valve plunger and the shell, or in other words, the effective passage around the plunger in the valve chamber, has been theoretically sufficient to accommodate the air which passed through the plug and seat. According to the present invention, however, I enlarge the valve chamber to a larger diameter than the lower part of the seat G, thereby greatly enlarging the area of the passage around the plunger. No reason has been apparent for making this change and the operation of making the valve has not accidentally produced the structure, since the enlargement of the chamber is a difficult operation owing to the fact that the diameter of the seat is relatively very small and the use of the ordinary counter-boring tools is prohibited. The result may be successfully accomplished, however, by first drilling the casing to the end of the bore D and then using an eccentric drill for boring out the chamber. It is desirable in increasing the capacity of the valve to make such enlargements as are possible through the valve seat and plug, but the main increase in capacity is secured by forming the valve chamber of a larger diameter than the bottom of the seat G.

The bottom of the valve chamber O may be, and preferably is, somewhat restricted in diameter in order to make a better seat for the spring holder L, and thus better guide the valve chamber and valve, as shown in the drawing, the passages through and around the spring holder being sufficient to pass any air which flows through the valve chamber.

It will be seen that by my invention I secure the desirable result of enlarging the capacity of the valve while at the same time the dimensions of the valve which have become standard are not affected so that the valve insides now on the market in large quantities can be interchangeably used with the casing provided by the invention.

What I claim is:—

1. A valve for tires or the like, comprising a casing, a seat member in said casing, a seat on the interior of said casing, a packing engaging said seat member and said seat, a valve chamber in said casing below said seat member, and a plunger working in said valve casing, said valve chamber being of larger diameter than the bottom of said seat.

2. In a valve for tires or the like, the combination of a casing having a screw-threaded bore at its end, a tapered seat below said screw-threaded bore, and a valve chamber below said seat, said chamber being of larger diameter than the bottom of said seat, and a valve mechanism fitting wholly within said valve casing, said valve mechanism comprising a plug, a seat member swiveled to said plug, a packing carried by said member and engaging said seat, a plunger below said seat member, a spring below said plunger, and a pin passing through said spring, plunger, seat member and plug and connecting said parts.

3. A valve for tires or the like comprising a casing, a seat member in said casing having an effective opening for the passage of air, a valve chamber below said seat member, and a plunger working in said valve chamber and coacting with said seat member, said valve chamber being enlarged so that the effective passage for air between said plunger and the walls of said valve chamber considerably exceeds the effective passage through said seat member.

4. In a valve for tires or the like, the combination of a casing having a screw-threaded bore at its end, a tapered seat below said screw-threaded bore, and a valve chamber below said seat, said chamber being of larger diameter than the bottom of said seat, and a valve mechanism fitting wholly within said valve casing, said valve mechanism comprising a plug, a seat member swiveled to said plug, a packing carried by said member and engaging said seat, a plunger below said seat member, a spring below said plunger, a spring holder for said spring, a pin passing through said spring, plunger, seat member, plug and spring holder and connecting said parts, and said valve chamber being restricted at its lower end to receive a portion of said spring holder.

In witness whereof, I have hereunto signed my name in the presence of two subscribing witnesses.

MAXIMILIAN CHARLES SCHWEINERT.

Witnesses:
    EUGENE V. MYERS,
    THOMAS F. WALLACE.